May 28, 1957     E. E. GILBERT ET AL     2,793,964

METHOD OF RENDERING AMBER THE SURFACE OF POLYETHYLENE PLASTIC

Filed April 29, 1954

FLUOROSULFONIC ACID OR
SULFUR TRIOXIDE IN
TETRACHLOROETHYLENE

CAUSTIC SODA SOLUTION

INVENTORS
EVERETT E. GILBERT
CHARLES B. MILLER
BY
ATTORNEY

United States Patent Office 2,793,964
Patented May 28, 1957

2,793,964

METHOD OF RENDERING AMBER THE SURFACE OF POLYETHYLENE PLASTIC

Everett E. Gilbert, Flushing, and Charles B. Miller, Lynbrook, N. Y., assignors to Allied Chemical & Dye Corporation, New York, N. Y., a corporation of New York Application April 29, 1954, Serial No. 426,578

12 Claims. (Cl. 117—33.3)

This invention relates to a mehod of conditioning or treating polyethylene surfaces to change their characteristics by imparting thereto selected desirable superficial coloring properties. More particularly it relates to a process by which polyethylene may be rendered amber in color, and to compositions of matter formed from the ambered polyethylene.

Heretofore polyethylene plastic has found ready commercial acceptance for use as containers for a wide variety of substances, because of its generally desirable properties including inertness, toughness, and flexibility. It has not however been practicable to employ this plastic as a container for photo-sensitive chemicals because of its general transparency and translucency, which permit passage through the container wall of light which encompasses substantially the entire solar spectrum, including those wave lengths which may be particularly effective to promote decomposition or other undesired reactions in enclosed chemicals. Accordingly polyethylene containers have not heretofore been suitable for storage of hydrogen peroxide, silver nitrate, or other light sensitive or photo-chemically active materials which are normally stored in amber colored transparent containers.

An object of this invention is to provide a method of treating the surface of a body of polyethylene plastic in such manner that the same is rendered generally brown in color.

A second object of this invention is to provide polyethylene plastic having a darkened, brown surface, whereby the same may be employed to protect light-sensitive materials.

A further object of this invention is to provide as a new product, a container fabricated from polyethylene having a surface which is brown in color.

Other objects will be apparent to those skilled-in-the-art on inspection of the following description.

Figure 1:
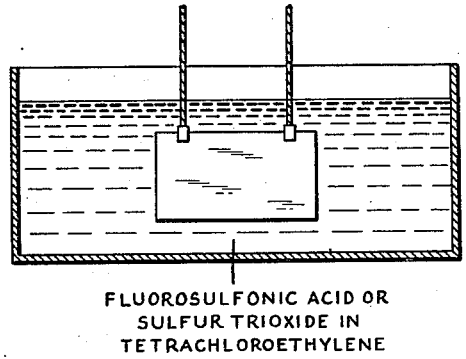
Figure 2:
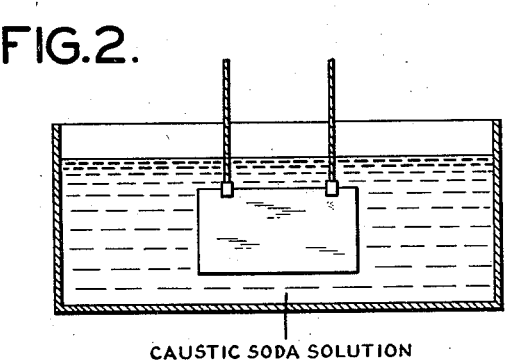
Figure 3:
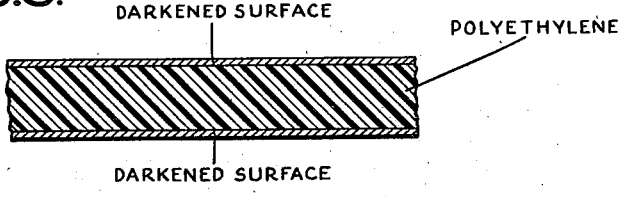

In the accompanying drawing Figures 1 and 2 indicate diagrammatically methods of treating polyethylene plastic in accordance with certain aspects of the invention, and Figure 3 is a cross-section on enlarged scale of a sheet of polyethylene having opposed surfaces treated in accordance with the invention.

According to certain of its aspects, this invention comprises the treatment of a polyethylene surface to render the same brown in color as indicated diagrammatically in Figure 3 by a one or two-step operation, the first step of which involves contact with an agent selected from the group consisting of (a) fluorosulfonic acid and (b) sulfur trioxide plus tetrachloroethylene. The treated polyethylene surface then is permanently brown in color having a greenish cast. If the first treating step is followed by a second step wherein the surface is washed with an alkaline solution, the character of the brown coloration changes to golden brown or amber.

In practice of the invention, the preferred method of effecting the first step in the conditioning of the surface as indicated in Figure 1 of the drawing is to immerse the plastic body to be conditioned for example a polyethylene bottle, or polyethylene film or strip to be fabricated into a container, into a mass of liquid conditioning medium, or to pour the medium over the particular area or surface to be treated. Alternatively the medium may be employed as spray in which case drops of the liquid medium suspended in gas such as air, may be passed over or sprayed onto the desired surface. If desired, portions of the plastic body which are not intended to be treated may be covered during treatment by means of inert protective coatings which may subsequently be readily removed.

The degree of coloring or darkening effected in this first step of the conditioning process and accordingly the degree of ultimate ambering may be varied by effecting contact of the polyethylene mass with the conditioning medium for varying periods of time. Contact times of from 1 second to 300 seconds produce results of satisfactory severity. Preferred time when using sulfur trioxide in tetrachloroethylene is 1 to 60 seconds; when using fluorosulfonic acid, it is preferably longer, say 60 to 300 seconds. Preferred time of contact required to effect the first step of the desired coloring or darkening will generally be less than one minute and usually not greater than 20 seconds. When starting with the normally whitish, translucent, or transparent smooth polyethylene surface for example, longer contact times yield surfaces of generally progressively greater coloration and darkness.

As the period of contact increases, the amount of chemical reaction between plastic surface and conditioning medium may increase and the tendency of the plastic to color or darken may be augmented. The length of contact required to produce a particular amount of coloring or darkening will vary depending upon the prior history and pretreatment of the plastic and of the surface, and the particular conditioning agent employed. The time of contact will be decreased as the temperature of reaction is raised.

Preferred concentrations of these reagents may be
(a) 10% to 100% by weight of fluorosulfonic acid, and
(b) 0.1% to 1.0% by weight of sulfur trioxide in tetrachloroethylene.

The chemical reactions which occur at the surface of the plastic polyethylene during the first step of the conditioning or treating may include sulfonation. The reaction in all cases is substantially confined to the surface, leaving the main bulk of the material unaffected. Thus although only the surface is in fact treated, the entire body of polyethylene appears to have an amber coloring. The amount of chemical reaction required to effect the conditioning is extremely slight; for example, typical darkened products after the first step of the ambering were found to contain generally less than .05% of sulfur by weight of polyethylene. Alternatively expressed, a film of polyethylene plastic of 10 mil thickness, one side of which has been contacted as by fluorosulfonic acid in this first step, will be found to contain less than 0.01% by weight of sulfur.

Treatment of polyethylene with fluorosulfonic acid or with sulfur trioxide in tetrachloroethylene in accordance with the first step of this invention, may be effected under non-catalytic conditions at ordinary room temperatures. Satisfactory results are obtained here when the temperature of operation is 20° C. to 50° C., say 25° C. to 35° C.

As removed from this first step of the process, the polyethylene may be found to be generally greenish-brown in color. Further treatment of the plastic surface to convert this color to golden-brown or amber may be conducted in a second step in which the polyethylene surface from the first step is treated with alkaline material.

In the desired method of conducting this second step, it may be preferable first to permit the conditioning agent from the first step to drain and/or then to wash the surface with a preliminary wash as with water to remove most if not all of the above-noted agent from the surface of the polyethylene.

The second step proper comprises an alkaline washing of the polyethylene surface which has been conditioned in the first step, with or without draining or water washing between the two steps. This second step may be conducted as by spraying the alkali over the surface of the plastic, by pouring the alkali over the same, or by dipping the conditioned plastic into an alkaline solution as illustrated diagrammatically in Figure 2 of the drawing, the last named being preferred.

The preferred alkaline washes are those which have a pH in the range of 9 to 14 or a dissociation constant of $10^{-4}$ to about 1. Typical of such reagents are inorganic compounds such as sodium hydroxide, sodium carbonate, sodium bicarbonate, $NH_4OH$, or organic bases such as primary, secondary, tertiary amines, or alcohol amines such as tertiary ethanolamine. Preferably these alkalies will be employed in dilute aqueous solution. Preferred among the above-noted is sodium hydroxide in aqueous solution of 1 to 10%, say 4% by weight.

Water washing to remove the alkali solution is desirable after completion of this second step.

The polyethylene plastic which has been subjected to this two-step operation will be found to be superficially amber in color but otherwise will be found to be substantially unaffected in physical properties and in bulk chemical properties.

Polyethylene having brownish color produced in accordance with this invention will be suitable for storage of light sensitive materials including for example hydrogen peroxide. A container fabricated of polyethylene, may be treated according to the one or two-step process described to render either the inside or the outside surface the desired brown color. Either type brownish coloration is permanent with respect to neutral electrolytic solutions or materials or organic substances inert with respect to polyethylene. However the brown color is susceptible of change from greenish to golden upon contact with alkaline materials and of reversion to greenish brown upon contact with acid solutions. Hence, for independence from such change occurring, development of the color on the outside surface of the container is preferred.

In each of the following examples, the polyethylene starting material was colorless or whitish, and was transparent.

Example I

A strip of polyethylene of 2" x 1" x 10 mil dimensions was immersed in 100% fluorosulfonic acid for a period of two minutes, at the end of which time a greenish-brown coloration appeared on the surface. The strip was immersed in 5% aqueous solution of sodium hydroxide and the color changed to amber. It was subsequently washed with water to remove the caustic. The resultant ambered material permanently retained its amber color and had substantially the same transparency as the original strip.

Example II

A strip of polyethylene of 2" x 1" x 10 mil dimensions was held within the vapor of fluorosulfonic acid in air for a period of 5-10 minutes, at the end of which time a greenish-brown coloration appeared on the surface. The strip was immersed in 5% aqueous solution of sodium hydroxide and the color changed to amber. On subsequent washing with water, the permanently ambered polyethylene strip was found to be substantially unchanged with respect to transparency.

Example III 3 strips of polyethylene of 2" x 1" x 10 mil dimension were suspended respectively in 0.1%, 1.0%, and 10.0% solutions of sulfur trioxide in tetrachloroethylene for a period of 10 seconds. At the end of this time those strips which had been in the 1.0% and 10.0% solutions were found to be brownish-green in color. Upon washing with 5% aqueous solution of caustic, the greenish-brown color changed permanently to amber, the resultant ambered strips being of substantially the same transparency as the original strips.

It will be apparent to those skilled-in-the-art that details of operation whereby polyethylene may be rendered brown in color, may be varied and that the invention is not to be limited to the specific examples and disclosures which are here presented for purposes of illustration only.

We claim:

1. The method of imparting a brownish coloration to a surface of polyethylene plastic which comprises contacting the same with an agent selected from the group consisting of (a) fluorosulfonic acid and (b) sulfur trioxide dissolved in tetrachloroethylene.

2. The method of rendering amber the surface of polyethylene plastic which comprises contacting the same with an agent selected from the group consisting of (a) fluorosulfonic acid and (b) sulfur trioxide dissolved in tetrachloroethylene, and subsequently washing said surface with an alkaline substance.

3. The method as claimed as claimed in claim 2 wherein said alkaline substance is an aqueous solution of an inorganic alkali selected from the group consisting of sodium hydroxide, sodium carbonate, and sodium bicarbonate.

4. The method of rendering amber the surface of polyethylene plastic which comprises contacting the same with an agent selected from the group consisting of (a) fluorosulfonic acid and (b) sulfur trioxide dissolved in tetrachloroethylene at temperature of 25° C. to 35° C. for 1 to 300 seconds, and subsequently washing said surface with alkaline material.

5. The method of rendering amber the surface of polyethylene plastic which comprises contacting the same with fluorosulfonic acid at 25° C. to 35° C. for 60 to 300 seconds, and subsequently washing said surface with aqueous alkaline solution.

6. The method of rendering amber the surface of polyethylene plastic which comprises contacting the same with sulfur trioxide in tetrachloroethylene at 25° C. to 35° C. for 1 to 60 seconds, and subsequently washing said surface with aqueous alkaline solution.

7. The method as claimed in claim 6 wherein said sulfur trioxide is present in said tetrachloroethylene to the extent of 1% to 10% by weight thereof.

8. An article of polyethylene plastic having permanent brown coloration on surfaces thereof formed by contacting said surfaces with a material selected from the group consisting of (a) fluorosulfonic acid and (b) sulfur trioxide in tetrachloroethylene.

9. An article of polyethylene plastic of apparent amber color formed by contacting surfaces of the polyethylene plastic with a material selected from the group consisting of (a) fluorosulfonic acid and (b) sulfur trioxide in tetrachloroethylene, followed by an alkaline wash.

10. A container suitable for use in storing light-sensitive materials comprising a surrounding envelope within which light-sensitive material may be placed, of polyethylene plastic having permanently brown surface the coloration of said surface having been produced by contacting surfaces of the polyethylene plastic with a material selected from the group consisting of (a) fluorosulfonic acid and (b) sulfur trioxide in tetrachloroethylene.

11. A container adapted for use in storing light-sensitive materials comprising a surrounding envelope, within which light-sensitive material may be placed, of polyethylene plastic of apparent amber color, the said amber color having been produced by contacting surfaces of the polyethylene plastic with a material selected from the group consisting of (a) fluorosulfonic acid and (b) sulfur trioxide in tetrachloroethylene followed by washing with alkaline solution.

12. The method as claimed in claim 2 wherein said alkaline substance comprises an amine.

References Cited in the file of this patent

UNITED STATES PATENTS

| | | |
|---|---|---|
| 2,400,720 | Staudinger | May 21, 1946 |
| 2,668,134 | Horton | Feb. 2, 1954 |